May 3, 1932. B. FÖRSTER 1,856,953
MACHINE FOR THE PRODUCTION OF SPLIT RINGS
Filed Jan. 17, 1930 3 Sheets-Sheet 1
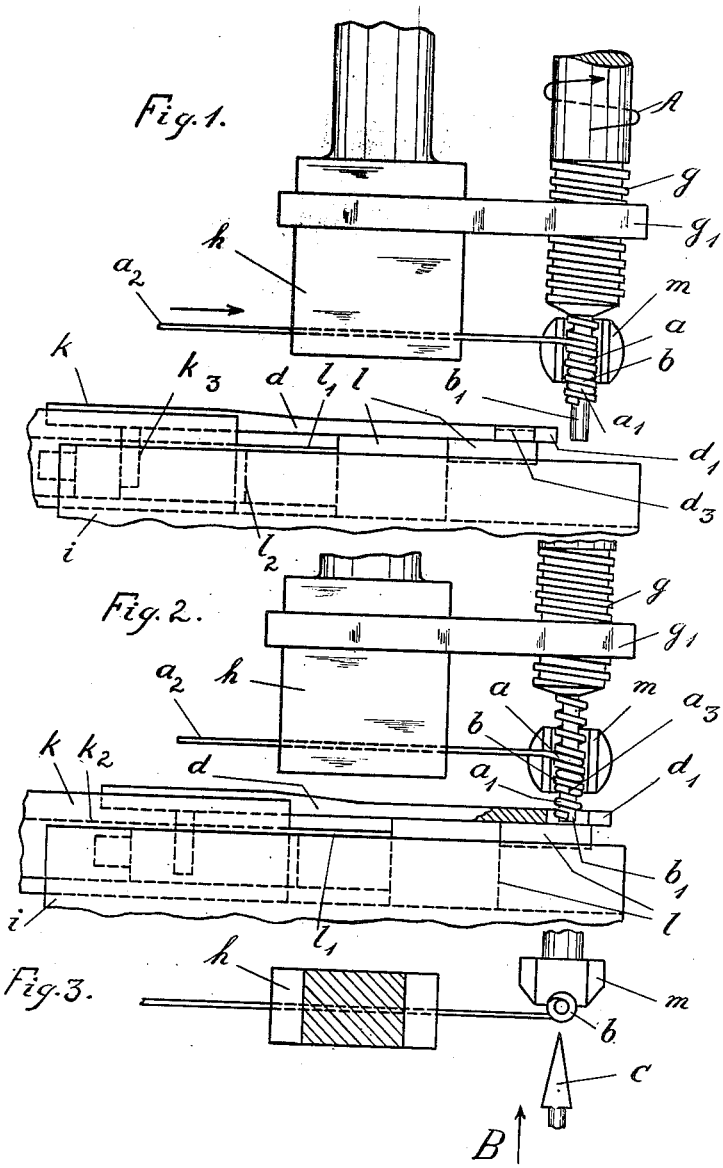

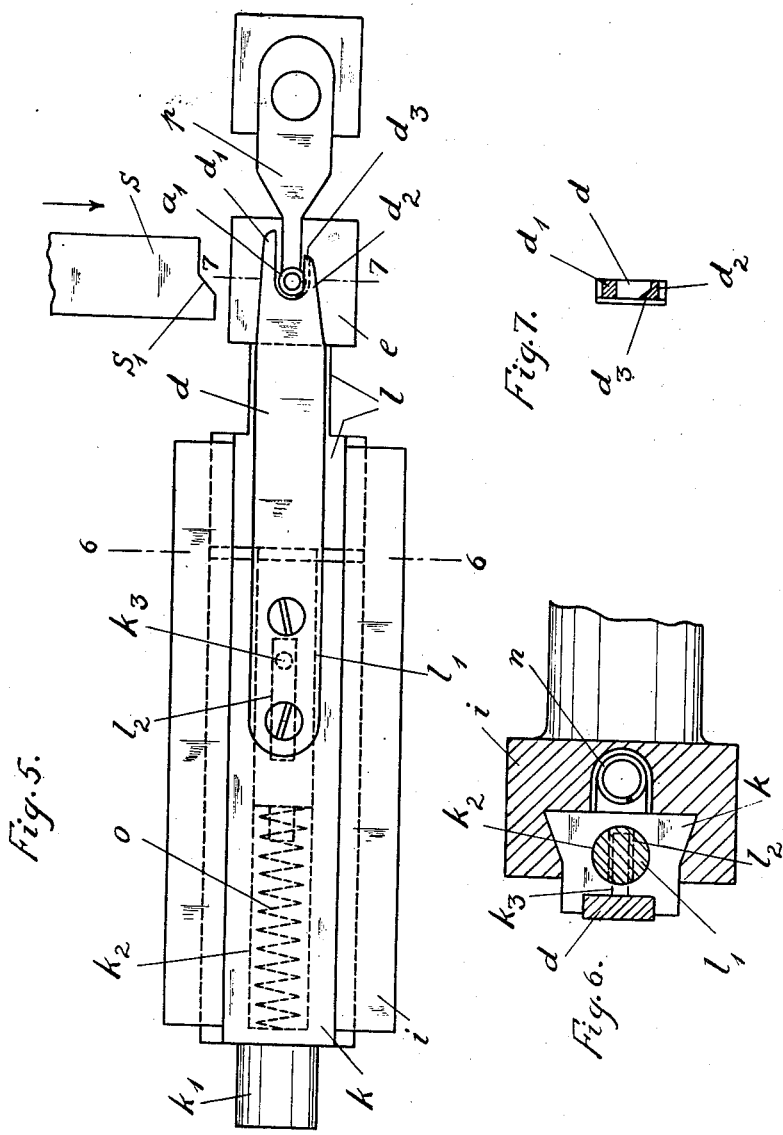

Patented May 3, 1932

1,856,953

UNITED STATES PATENT OFFICE

BERNHARD FÖRSTER, OF PFORZHEIM, GERMANY

MACHINE FOR THE PRODUCTION OF SPLIT RINGS

Application filed January 17, 1930, Serial No. 421,465, and in Germany February 23, 1929.

This invention relates to a machine for the automatic production of split rings such as used as key rings, suspender rings and the like.

The novelty consists in that the machine consists essentially of an arrangement for the production of approximately two turn wire spirals, of a removing and conveying device, and finally of a pressing device in which the work inserted by means of a conveying device is compressed to form a split ring.

An embodiment of the invention is illustrated by way of example in the accompanying drawings.

Fig. 1 shows the screw threaded mandrel in the screwed forward position and the removing and conveying arrangement in the inoperative position.

Fig. 2 shows in elevation the threaded mandrel in screwed back position and the removing and conveying arrangement in raised position.

Fig. 3 shows in top plan view the screw threaded mandrel with the wire cutter.

Fig. 5 shows the bottom swage in top plan view in the position before the beginning of the pressing operation.

Fig. 6 is a cross section of the removing and conveying arrangement on line 6—6 of Fig. 5.

Fig. 7 is a cross section of the removing fork on line 7—7 of Fig. 5.

Figures 4, 8, 9:
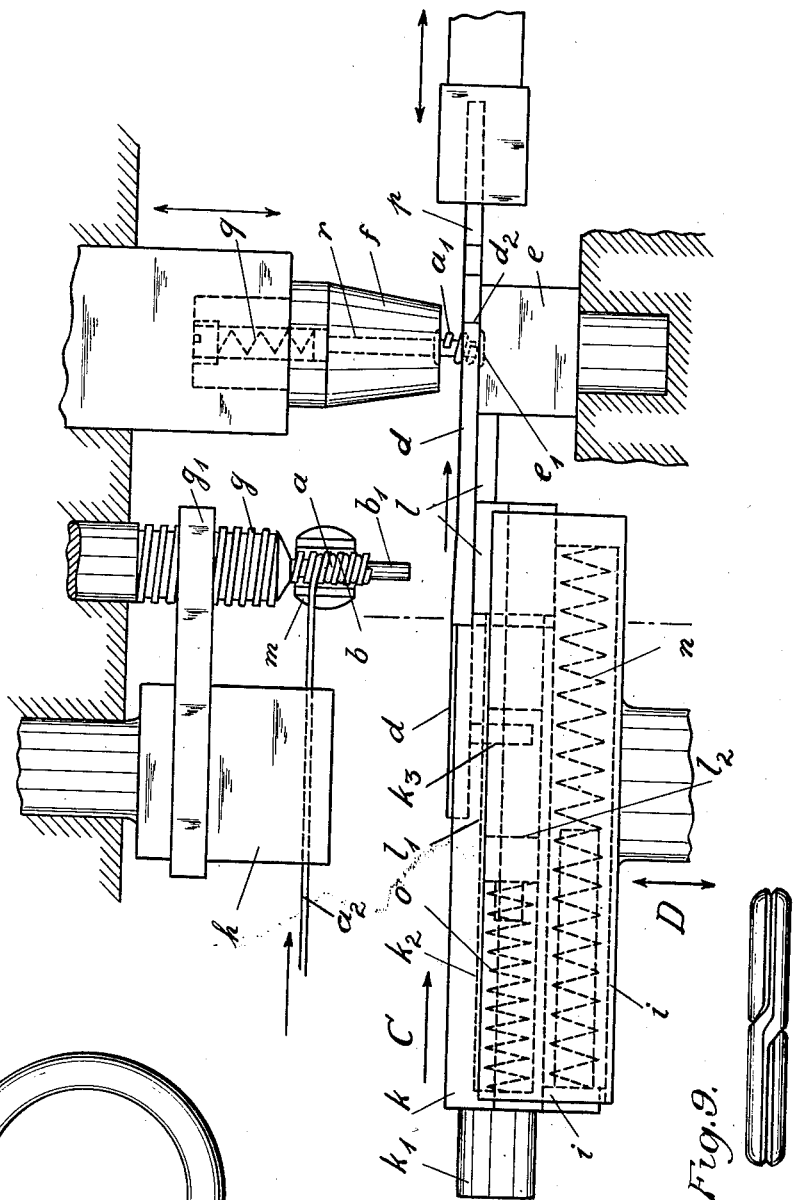
Fig. 4 shows the pressing arrangement in elevation.
Fig. 8 shows in plan view a split ring as produced on the machine.
Fig. 9 is a side elevation of Fig. 8.

The automatic production of split rings with the aid of the mechanism according to the invention is composed of the following operations:

I. Production of the wire spiral $a$ with the aid of a screw threaded mandrel $b$.

II. Cutting of two threads $a'$ by means of the cutter $c$.

III. Removing of the two turn wire spirals $a_1$ from the mandrel $b$ by means of the removing fork $d$ and conveying the same onto the bottom swage $e$.

IV. Pressing of the split ring between top swage $f$ and bottom swage $e$, and ejecting of the finished work. The screw threaded mandrel $b$ is carried by a screw spindle $g$, the pitch of which corresponds with that of the mandrel $b$, said screw spindle being rotatably mounted in a female thread $g_1$. When the screw spindle $g$ is turned in the direction of the arrow line A (Fig. 1) the mandrel $b$ is also turned and winds up a portion of the wire $a_2$ for forming the wire spiral $a$, in pulling the wire through a guide piece $h$. The screw spindle $g$ is then rotated in opposite direction to the arrow line A (Fig. 2). As the forward rotation in the direction of the arrow line A and also the backward rotation in the opposite direction consists of two complete revolutions the mandrel $b$ is withdrawn at the backward rotation from the two extreme turns $a_1$ of the wire spiral $a$, said two turns sitting then on the smooth not threaded end $b_1$ of the mandrel $b$ (Fig. 2). At this moment the removing and conveying arrangement, consisting essentially of a slidable housing $i$, a conveying slide $k$, a conveying plate $l$ and a removing fork $d$, is brought from the inoperative position shown in Fig. 1, into the raised position shown in Fig. 2, the fork $d$ being pushed towards the end $b_1$ of the mandrel so that the extreme turn of the work $a_1$ gets between the fork arms $d_1$ and $d_2$ and below the ledge $d_3$ in the fork (Fig. 7). The cutter $c$ advances at the same time in the direction of the arrow line B towards the wire spiral $a$ and cuts the wire at the point $a_3$, the mandrel being supported by a counterbearing $m$ against bending or breaking. The cut-off piece $a_1$ of the wire spiral, lying on the conveying plate $l$ between the fork arms $d_1$ and $d_2$, is then at the descending of the conveying arrangement removed from the smooth end $b_1$ of the mandrel $b$ and conveyed to the pressing arrangement (Fig. 4) by the slide $k$ being shifted in the direction of the arrow line C. During this time the mandrel $b$ winds up two fresh turns of the wire spiral.

The housing $i$ of the removing and conveying arrangement carries out only an ascending and descending movement in the direction of the arrow line D (Fig. 4). The conveying slide $k$ is reciprocated in the housing $i$ by a pressure exerted upon an extension $k_1$ by means of a lever oscillating under the action of an eccentric, not shown, the slide $k$ being pressed permanently against said lever by the action of a spring $n$.

In the housing $i$ the conveying table $l$ is further shiftably mounted. It is connected by a bolt $l_1$ with the conveying slide $k$, as said bolt engages with the bore $k_2$ of the conveying slide, a spiral spring bearing against the end of the belt $l_1$ located in said bore and maintaining the conveying table at the distance from the conveying slide $k$ shown in Figs. 1 and 2. This spacing is regulated in that bolt $l_1$ has a longitudinal slot $l_2$ with which engages an abutment pin $k_3$, fixed in the conveying slide $k$, and against which the bolt $l_1$ is pressed by the action of a spring $o$ so that the distance between conveying plate $l$ and conveying slide $k$ can become shorter but never longer. When during the conveying of the work $a_1$ the conveying plate $l$ strikes against the bottom swage $e$, its shifting movement in the direction of the arrow line C (Fig. 4) is stopped. The conveying slide $k$ and the fork $d$ fixed on the same continue the conveying movement whereby the work $a_1$ is pushed onto the bottom swage $e$, on which the counterholder $p$ has arrived in the meantime to prevent the further movement of the work $a_1$, which might be caused by the inertia of the work. The top swage $f$ is then lowered onto the bottom swage $e$, the holding pin $r$, shiftably guided in a central bore in opposition to the action of a spring $q$ and extending through the wire spiral $a_1$, striking first against the bottom swage $e$. The conveying slide $k$ and with the same the fork $d$ and also the counterholder $p$ return then into their inoperative positions.

The wire spiral $a_1$ accurately centered by the holding pin $r$ is then compressed between the bottom swage $e$ and the top swage $f$ to form a finished split ring which, after the ascending of the top swage $f$, is removed from the bottom swage $e$ by means of a stripper $s$. The split ring is easily and securely lifted out of the cavity $e_1$ of the bottom swage $e$ by a short rotation of the work caused in that the stripper $s$ has a short inclined face $s_1$ imparting the short rotation to the work $a_1$ at the advancing of the stripper. After having lifted the work $a_1$ out of the cavity $e_1$, the stripper $s$ continues to advance so that the work is securely dropped from the bottom swage $e$, whereupon the stripper returns into its inoperative position.

The top swage is driven in known manner from a crank or cam shaft, from which also the movements of all other movable elements are derived with the aid of known means, such as cam discs, oscillatable levers and gears.

A stripper is preferably provided also for the top swage $f$ and operates, when the top swage $f$ has returned into its inoperative position.

I claim:—

1. A machine for the automatic production of split rings, comprising in combination means for producing wire spirals having approximately two turns, a removing and conveying means, and a pressing means in which the work inserted by said conveying means is compressed to form a split ring.

2. In a machine as specified in claim 1, the means for the production of a wire spiral consisting of approximately two turns, comprising in combination a screw threaded mandrel, a screw spindle of similar pitch as said mandrel carrying said mandrel, a nut guiding said screw spindle, means for alternately rotating said screw spindle to complete two rotations in forward and backward directions to make said mandrel first wind two spiral turns of the wire and then to withdraw from out of the extreme two turns so that these turns are sitting on the smooth lower end of the mandrel, a cutter for severing these extreme two turns of the wire, and a fork for removing said cut off wire turns.

3. In a machine as specified in claim 1 the removing and conveying means, comprising in combination a slide housing adapted to move upwards and downwards, a conveying slide shiftably mounted on said housing and having a horizontal bore, a removing fork on the front end of said slide, a conveying plate on said housing, a bolt at the rear end of said conveying plate engaging with said bore of said slide and having a longitudinal slot, a spiral spring in said slide bore pressing against said bolt for adjusting said conveying plate at a suitable distance from said slide, an abutment pin in said slide engaging with said longitudinal slot of said bolt to regulate the spacing between said conveying plate and said slide, and a bottom swage adapted to carry the work.

4. In a machine as specified in claim 1, the press means, comprising in combination a bottom swage having a cavity in its top surface to receive the work from the mandrel, a top swage having a central bore, and a spring-controlled holding pin in said central bore for holding the work stripped off from the mandrel.

5. In a machine as specified in claim 1, in combination with the mandrel, a removing fork of the removing and conveying means having two arms, and a ledge in said fork between said arms the last turn of the work engaging under said ledge when the work is being stripped off the lower end of said mandrel.

6. A machine as specified in claim 1, comprising in combination with the removing and conveying means and with the press means consisting of a top swage and a bottom swage, a removing fork in said removing and conveying means, and a counter holder opposite said fork at the outer side of the bottom swage adapted to limit the conveying movement.

7. A machine as specified in claim 1, comprising in combination with the bottom swage of the press means, a stripper adapted to move over said lower swage after the finishing of a split ring said stripper having an inclined face adapted to lift said split ring out of said lower swage in imparting a short rotation to said split ring.

In testimony whereof I affix my signature.

BERNHARD FÖRSTER.